(12) United States Patent
Pernyer et al.

(10) Patent No.: US 11,395,138 B2
(45) Date of Patent: Jul. 19, 2022

(54) PROVIDING ACCESS TO A LOCK FOR A SERVICE PROVIDER

(71) Applicant: ASSA ABLOY AB, Stockholm (SE)

(72) Inventors: Kenneth Pernyer, Stockholm (SE); Sona Singh, Täby (SE); Stefen Strömberg, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 179 days.

(21) Appl. No.: 16/466,195

(22) PCT Filed: Dec. 6, 2017

(86) PCT No.: PCT/EP2017/081675
§ 371 (c)(1),
(2) Date: Jun. 3, 2019

(87) PCT Pub. No.: WO2018/104383
PCT Pub. Date: Jun. 14, 2018

(65) Prior Publication Data
US 2020/0162905 A1    May 21, 2020

(30) Foreign Application Priority Data
Dec. 6, 2016    (EP) .................................. 16202447

(51) Int. Cl.
*H04W 12/0431*        (2021.01)
*G07C 9/00*            (2020.01)
(Continued)

(52) U.S. Cl.
CPC .... *H04W 12/0431* (2021.01); *G07C 9/00896* (2013.01); *H04L 9/0863* (2013.01);
(Continued)

(58) Field of Classification Search
USPC ....................................................... 713/171
See application file for complete search history.

(56) References Cited

U.S. PATENT DOCUMENTS 9,351,193 B2 * 5/2016 Raleigh .................. G06Q 40/00
9,741,186 B1 * 8/2017 Lemke ................ H04L 63/0492
(Continued)

FOREIGN PATENT DOCUMENTS

CN      102682410       9/2012
CN      105083216       11/2015
(Continued)

OTHER PUBLICATIONS

Khosraviani et al., "A Simple Lock Manager for Distributed Heterogeneous Systems", IEEE 7th International Conference on Network Computing, Sep. 1, 2011, pp. 54-59 (Year: 2011).*
(Continued)

*Primary Examiner* — Khalil Naghdali
(74) *Attorney, Agent, or Firm* — Sheridan Ross P.C.

(57) ABSTRACT

It is presented method for providing access to a lock for provision of a service. The method is performed in a lock manager and comprises the steps of: receiving a request for access to the lock, the request being based on the service consumer ordering a service requiring access to a physical space which is secured by the lock; sending a first consumer request to a service consumer device, asking whether to grant access to the lock for a service provider agent to provide the service; receiving a first positive consumer response from the service consumer device, indicating that the service consumer allows the service provider agent to access the physical space secured by the lock; generating a temporary credential for the service provider agent; providing the temporary credential to the service provider agent; and configuring the lock to accept the temporary credential.

20 Claims, 4 Drawing Sheets

(51) Int. Cl.
  *H04L 9/08*    (2006.01)
  *H04W 12/06*   (2021.01)
  *H04W 12/041*  (2021.01)

(52) U.S. Cl.
  CPC ......... *H04W 12/041* (2021.01); *H04W 12/06* (2013.01); *H04L 2209/805* (2013.01)

(56) References Cited

U.S. PATENT DOCUMENTS

| | | | |
|---|---|---|---|
| 2005/0165612 A1 | 7/2005 | Van Rysselberghe | |
| 2006/0165060 A1* | 7/2006 | Dua | G06Q 20/325 370/352 |
| 2012/0280783 A1* | 11/2012 | Gerhardt | H04W 12/08 340/5.6 |
| 2013/0099892 A1* | 4/2013 | Tucker | H04W 4/80 340/5.61 |
| 2013/0332727 A1* | 12/2013 | Jaudon | H04L 63/0807 713/159 |
| 2014/0189808 A1* | 7/2014 | Mahaffey | H04L 63/0853 726/4 |
| 2015/0371468 A1 | 12/2015 | Mackin et al. | |
| 2017/0316185 A1* | 11/2017 | Park | H04L 63/102 |
| 2017/0345236 A1* | 11/2017 | Kuenzi | G07C 9/00571 |
| 2020/0349785 A1* | 11/2020 | Kuenzi | G07C 9/00571 |

FOREIGN PATENT DOCUMENTS

| | | |
|---|---|---|
| CN | 105488887 | 4/2016 |
| DE | 10147936 | 4/2003 |
| KR | 10-2016-0076724 | 7/2016 |
| WO | WO 2015/079203 | 6/2015 |

OTHER PUBLICATIONS

Jain et al., 2016 IEEE Annual India Conference (INDICON), "Single Sign On using Bluetooth Device", pp. 1-5 (Year: 2016).*
International Search Report and Written Opinion for International (PCT) Patent Application No. PCT/EP2017/081675, dated Feb. 9, 2018, 15 pages.
International Preliminary Report on Patentability for International (PCT) Patent Application No. PCT/EP2017/081675, dated Feb. 22, 2019, 18 pages.
English Translation of Official Action for China Patent Application No. 201780074624.X, dated Nov. 3, 2020, 16 pages.

* cited by examiner

PROVIDING ACCESS TO A LOCK FOR A SERVICE PROVIDER

CROSS REFERENCE TO RELATED APPLICATIONS

This application is a national stage application under 35 U.S.C. 371 and claims the benefit of PCT Application No. PCT/EP2017/081675 having an international filing date of 6 Dec. 2017, which designated the United States, which PCT application claimed the benefit of European Patent Application No. 16202447.5 filed 6 Dec. 2016, the disclosure of each of which are incorporated herein by reference.

TECHNICAL FIELD

The invention relates to a method, lock controller, computer program and computer program product for providing access to a lock for a service provider using a temporary credential.

BACKGROUND

Locks and keys are evolving from the traditional pure mechanical locks. These days, electronic locks are becoming increasingly common. For electronic locks, no mechanical key profile is needed for authentication of a user. The electronic locks can e.g. be opened using a personal identification code (PIN) or electronic key. The electronic key and electronic lock can e.g. communicate over a wireless interface. Such electronic locks provide a number of benefits, including improved flexibility in management of access rights, audit trails, key management, etc.

When an owner or user of such an electronic lock consumes a service, that person is here denoted a service consumer. The service can be any service where the person performing the service needs the electronic lock to be opened. For instance, the service can be a delivery of a product, a cleaning service, a builder/plumber/electrician, etc. To be able to consume the service, the service consumer thus needs to provide access to a service provider using the electronic lock.

US 2015/0371468 A1 presents a storage container for storing postal items, the container comprising: a container with a door, a locking means for locking the door shut, code input means for inputting a code to unlock the locking means, weighing means for measuring the weight of contents of the container, and communication means for communicating the measured weight of the contents when the door is locked shut, wherein a code for unlocking the locking means varies over time. The presented storage container is limited to providing access for deliveries. Such a solution is not suitable for general service access.

SUMMARY

It is an object to provide a solution for providing access to a lock which is applicable for all types of services.

According to a first aspect, it is presented method for providing access to a lock for provision of a service, the lock being associated with a service consumer. The method is performed in a lock manager and comprises the steps of: receiving a request for access to the lock, the request being based on the service consumer ordering a service requiring access to a physical space which is secured by the lock; sending a first consumer request to a service consumer device, asking whether to grant access to the lock for a service provider agent to provide the service; receiving a first positive consumer response from the service consumer device, indicating that the service consumer allows the service provider agent to access the physical space secured by the lock; generating a temporary credential for the service provider agent; providing the temporary credential to the service provider agent; and configuring the lock to accept the temporary credential.

The method may further comprise the step of: encrypting the temporary credential for the service provider agent, yielding an encrypted temporary credential, in which case the step of providing the temporary credential comprises providing the encrypted temporary credential to the service provider agent.

The temporary credential may be a temporary personal identification code, PIN.

The temporary credential may be a temporary electronic key for use in wireless authentication between a service provider agent device and the lock.

The method may further comprise the steps of: sending a second consumer request to a service consumer device, asking whether to grant access to the lock for the service provider agent to provide the service; receiving a second positive response from the service consumer device, indicating that the service consumer allows the service provider agent to access the physical space secured by the lock. In such a case, the steps of providing the temporary credential and configuring the lock are only performed when the second positive response has been received.

In one embodiment, when there is an absence of response to the second consumer request, the steps of providing the temporary credential and configuring the lock are still performed.

In one embodiment, when there is an absence of response to the second consumer request, the steps of providing the temporary credential and configuring the lock are prevented from being performed.

In one embodiment, the step of sending a second consumer request is only performed at a configured time prior to when access to a lock for the service provider agent is needed.

In one embodiment, the step of sending a second consumer request is only performed when the service provider agent is within a configured distance from the lock.

For recurring services by the service provider agent, the method may be repeated except for the steps of sending a first consumer request and receiving a first positive consumer response.

In one embodiment, the method further comprises the step of: deactivating the temporary credential in the lock.

According to a second aspect, it is presented a lock manager for providing access to a lock for provision of a service, the lock being associated with a service consumer. The lock manager comprises: a processor; and a memory storing instructions that, when executed by the processor, cause the lock manager to: receive a request for access to the lock, the request being based on the service consumer ordering a service requiring access to a physical space which is secured by the lock; send a first consumer request to a service consumer device, asking whether to grant access to the lock for service provider agent to provide the service; receive a first positive consumer response from the service consumer device, indicating that the service consumer allows the service provider agent to access the physical space secured by the lock; generate a temporary credential for the service provider agent; provide the temporary credential to the service provider agent; and configure the lock to accept the temporary credential.

The lock manager may further comprise instructions that, when executed by the processor, cause the lock manager to: send a second consumer request to a service consumer device, asking whether to grant access to the lock for the service provider agent to provide the service; and receive a second positive response from the service consumer device, indicating that the service consumer allows the service provider agent to access the physical space secured by the lock; and only execute the instructions to provide the temporary credential and configure the lock when the second positive response has been received.

The lock manager may further comprise instructions that, when executed by the processor, cause the lock manager to, when there is an absence of response to the second consumer request, the instructions to provide the temporary credential and configure the lock are still performed.

The lock manager may further comprise instructions that, when executed by the processor, cause the lock manager to, when there is an absence of response to the second consumer request, the instructions to provide the temporary credential and configure the lock are prevented from being performed.

The lock manager may further comprise instructions that, when executed by the processor, cause the lock manager to only execute the instructions to send a second consumer request at a configured time prior to when access to a lock for the service provider agent is needed.

The lock manager may further comprise instructions that, when executed by the processor, cause the lock manager to only execute the instructions to send a second consumer request when the service provider agent is within a configured distance from the lock.

The lock manager may further comprise instructions that, when executed by the processor, cause the lock manager to deactivate the temporary credential in the lock.

According to a third aspect, it is presented a computer program for providing access to a lock for provision of a service, the lock being associated with a service consumer. The computer program comprises computer program code which, when run on a lock manager causes the lock manager to: receive a request for access to the lock, the request being based on the service consumer ordering a service requiring access to a physical space which is secured by the lock; send a first consumer request to a service consumer device, asking whether to grant access to the lock for a service provider agent to provide the service; receive a first positive consumer response from the service consumer device, indicating that the service consumer allows the service provider agent to access the physical space secured by the lock; generate a temporary credential for the service provider agent; provide the temporary credential to the service provider agent; and configure the lock to accept the temporary credential.

According to a fourth aspect, it is presented a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
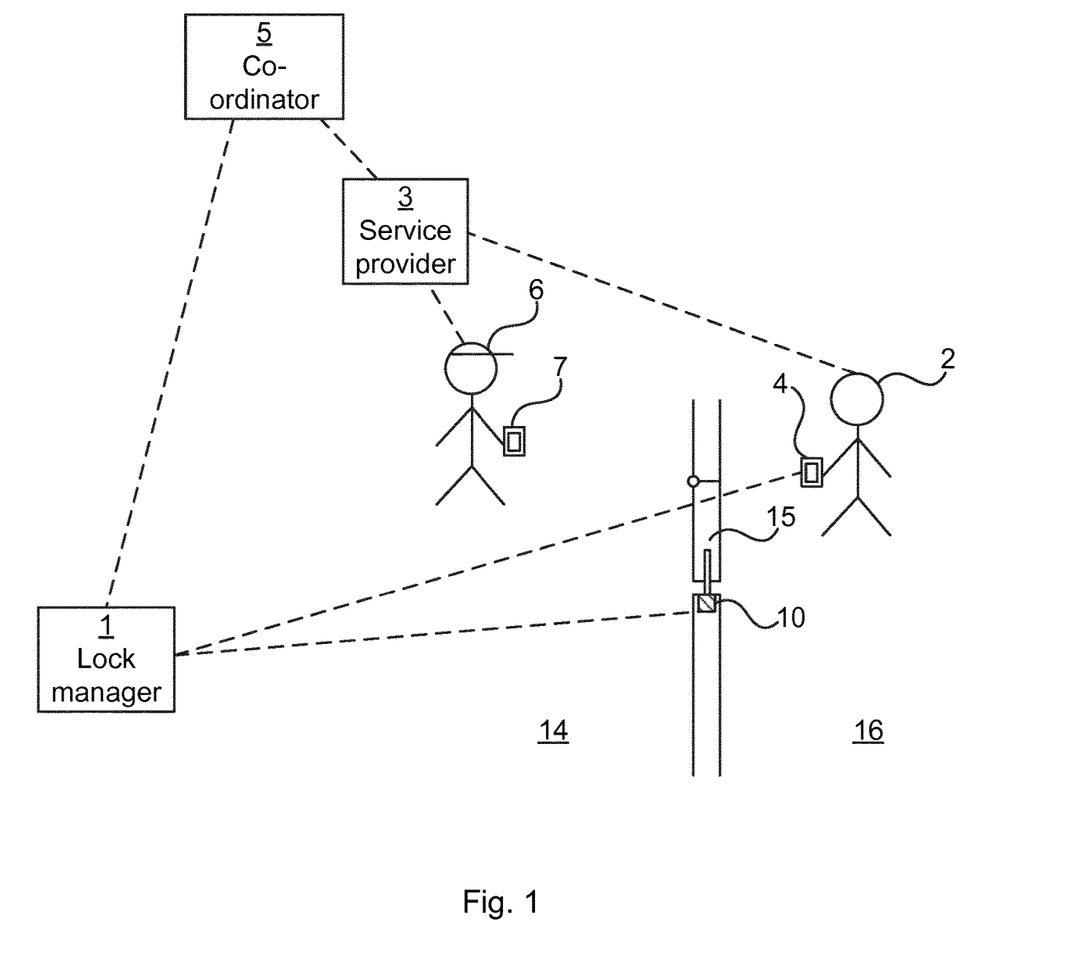
FIG. 1 is a schematic diagram showing an environment in which embodiments presented herein can be applied.

FIG. 1 is a schematic diagram showing an environment in which embodiments presented herein can be applied. Access to a physical space 16 is restricted by a physical barrier 15 which is selectively unlockable. The barrier 15 can be a door, gate, hatch, cabinet door, drawer, window, etc. The physical barrier 15 is provided in a surrounding physical structure (being a wall, fence, ceiling, floor, etc.) and stands between the restricted physical space 16 and an accessible physical space 14. Note that the accessible physical space 14 can be a restricted physical space in itself, but in relation to this physical barrier 15, the accessible physical space 14 is accessible. In order to control the locked or unlocked state of the barrier 15, a lock 10 is provided.

The owner or user of the lock 10 is here denoted a service consumer 2. The service consumer carries a service consumer device 4, which is a portable electronic device, e.g. a smartphone, mobile phone, tablet computer, laptop computer, etc.

The lock 10 is an electronic lock which is capable of communication with a lock manager 1. The lock manager can in turn, but does not need to, be connected to a plurality of similar locks. The lock manager 1 can configure the lock 10, e.g. by adding and/or removing credentials which should be allowed to have access. The lock 10 is an electronic lock and can be opened using a credential which is not mechanical. For instance, the credential can be a PIN (personal identification number) which is entered on a keypad connected to the lock 10. Alternatively or additionally, the lock 10 can be opened using a credential on an electronic key, and may be implemented as part of a mobile phone, a smartphone, a key fob, wearable device, smart phone case, access card, electronic physical key, etc. The electronic key can communicate with the lock 10 over a wired or wireless interface, e.g. using Bluetooth, Bluetooth Low Energy (BLE), any of the IEEE 802.15 standards, Radio Frequency Identification (RFID), Near Field Communication (NFC), any of the IEEE 802.11 standards, wireless USB (Universal Serial Bus), USB, Ethernet, serial connection (e.g. RS-485), etc. The lock 10 can communicate with a Lock Manager 1 over a wired or wireless interface, e.g. using Bluetooth, BLE, any of the IEEE 802.11 standards, wireless USB, USB, Ethernet, serial connection (e.g. RS-485), etc.

There is also a service provider server 3, controlled by a service provider. The service provider can e.g. be a delivery company, a cleaning company, a building company, a plumber, an electrician, etc. The service provider server 3 can also be provided by a third party, on behalf of the service provider. This is particularly useful for small businesses who may not want to set up their own service provider server.

As explained in more detail below, the service consumer 2 orders a service from the service provider controlling the service provider server 3.

The service provider uses a service provider agent 6 to conduct the service. The service provider agent 6 can be an employee or a sub-contractor of the service provider. The service provider agent 6 carries a service provider agent device 7, which is a portable electronic device, e.g. a smartphone, mobile phone tablet computer, laptop computer, etc. The functions described herein as being performed by the service provider agent device 7, can e.g. be performed in a software application (also known as app) executing on the service provider agent device. In one embodiment, the service provider agent device 7 can be used to provide an electronic key using a temporary credential, to thereby selectively control the opening of the lock 10.

A co-ordinator 5 is a server which co-ordinates communication between the different parties involved in this scenario of providing a service which needs access to the restricted physical space 16.

Communication between the different nodes in FIG. 1 can occur using local communication, e.g. using Bluetooth, Bluetooth Low Energy (BLE), any of the IEEE 802.15 standards, any of the IEEE 802.11 standards, wireless USB (Universal Serial Bus), USB, Ethernet, serial connection (e.g. RS-485), etc. and/or over wide area communication such as cellular networks and the Internet. On a higher layer, Internet Protocol (IP) could be used for the communication.

Figure 2:
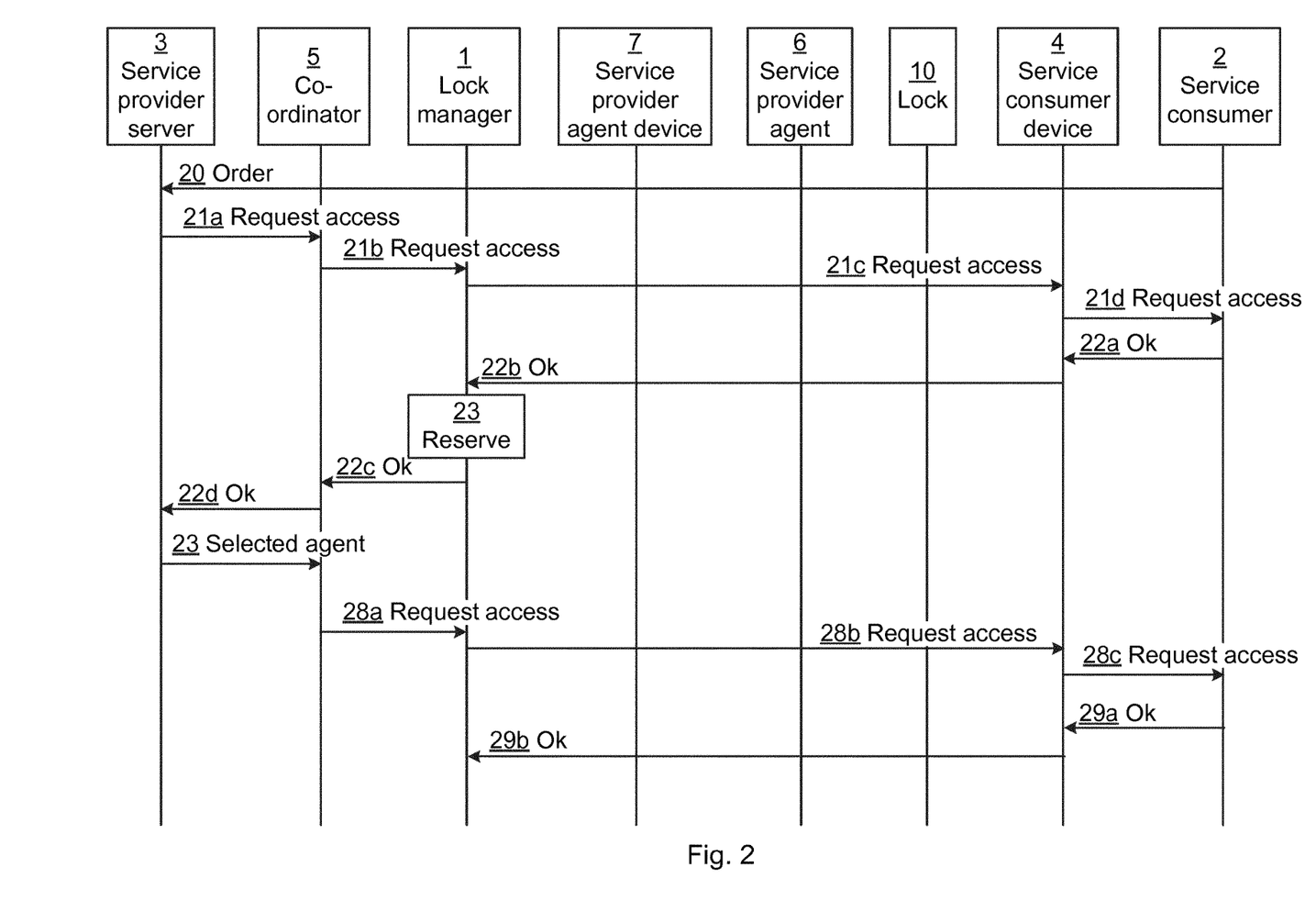
FIG. 2 is a sequence diagram illustrating communication in an example for providing a service in the environment of FIG. 1.

FIG. 2 is a sequence diagram illustrating communication in an example for providing a service in the environment of FIG. 1.

First, the service consumer 2 sends an order 20 for a service to a service provider server 3. The order 20 can be an order over an electronic service, such as the Internet, over telephone, in person, etc. When the order 20 is not electronic, a person of the service provider enters data of the order into the service provider server 3. It is to be noted that the order 20 can be an indirect order from the service consumer 2 via a third party and does not need to be directly from the service consumer 2 to the service provider server 3. For instance, in an e-commerce example, the service consumer 2 orders a physical product to be delivered from a vendor (being a third party not shown in FIG. 2). The vendor, in turn, makes use of a delivery company for delivery of the physical product to the service consumer 2. The selection of delivery company can be performed by the service consumer or the vendor. In this case, the service consumer 2 indirectly orders a delivery service from the delivery company, in which case the delivery company is the service provider.

The service provider server 3 sends a request 21a for access to the co-ordinator. The request 21a indicates that the service provider would like access to open the lock of the service consumer. The request 21a comprises an identifier (e.g. e-mail address or phone number) of the service consumer 2 (or his/her lock 10) and optionally a proposed time or schedule for providing the service of the order 20. If the service consumer 2 does not support access provision according to the rest of this sequence, this is replied to the service provider server 3 and the sequence ends. Otherwise, the co-ordinator sends a corresponding request 21b for access to the lock manager 1, which in turn sends a corresponding consumer request 21c to the service consumer device 4. The service consumer device 4 then asks the user in a request 21d for access, whether the service provider should be allowed access using the lock 10, optionally also including a suggested time or time window. This can e.g. be provided as a query in a software application (also known as app) of the service consumer device 4.

The service consumer 2 accepts the request (otherwise the sequence ends) in a positive consumer response 22a. The service consumer device 4 sends a corresponding positive consumer response ("ok") 22b to the lock manager 1.

At this stage, the lock manager 1 optionally reserves 23 resources for a temporary credential for the service provider agent 6 which is to be generated later. For instance, when the lock 10 accepts PIN codes, the lock device 1 can reserve one of a limited number of slots for acceptable PIN codes in the lock 10.

The lock manager 1 also sends a positive consumer response 22c optionally including a credential to the co-ordinator 5, which in turn can send a corresponding positive consumer response 22d to the service provider server 3 and store the credential if presented. In this way, the service provider knows that the consumer is ready to accept the delivery of the service (optionally at the suggested time, time window or schedule).

Once the service provider has selected a service provider agent 6 (i.e. physical person) which is to deliver the service, the service provider server 3 transmits a selected agent message 23 to the co-ordinator 5. This does not need to happen immediately and can occur quite some time after the service provider server 3 received the positive consumer response 22d.

Optionally, a second service consumer confirmation is now invoked. This can be very useful, e.g. if the service consumer happens to be home and the service is a package delivery, in which case the service consumer might not want the temporary credential to be generated. This provides greater flexibility and more control over temporary credential generation for the service consumer. As explained in more detail below, this can be triggered a certain time before expected delivery of service and/or when the service provider agent 6 is within a configured distance from the lock 10. Using the second consumer confirmation, the service consumer can choose whether to activate the credential or not for the service. When this second service consumer confirmation is performed, the co-ordinator 5 sends a second consumer request 28a to the lock manager 1, which sends a corresponding second consumer request 28b to the service consumer device 4. The service consumer device 4 again asks the user in a request 28c for access, whether the service provider should be allowed access using the lock 10. This can e.g. be provided as a query in an application of the service consumer device 4.

The service consumer 2 accepts this second request in a second positive consumer response 29a. Alternatively (not shown) the service consumer 2 rejects the second request, whereby the procedure ends. When accepted, the service consumer device 4 sends a corresponding positive consumer response 22b to the lock manager 1.

After receiving the selected agent message 23, and optionally performing the second service consumer confirmation, the co-ordinator 5 sends a get credential message 24 to the lock manager 1, or alternatively uses the stored credential when available. The lock manager 1 generates 25 (and optionally encrypts) the credential and responds with the generated credential 26a to the co-ordinator 5, which sends the generated or stored credential 26b to the service provider agent device 7. Also, the co-ordinator 5 sends a credential acknowledgement 27 to the service provider server 3 to inform that the credential has been provided to the service provider agent device 7.

The lock manager can now set up the lock 10 to accept the generated or stored credential by sending a configuration for the lock to accept the generated credential. The lock manager 1 also sends a credential active message 31a to the co-ordinator 5, which in turn sends a corresponding credential active message 31b to the service provider server 3, whereby the service provider is made aware of the fact that the lock to is ready to accept the credential provided to the service provider agent 6. The co-ordinator 5 also sends a credential active message 31c to the service provider agent device 7.

Once the service provider agent 6 arrives at the site of the lock to, the service provider agent 6 provides unlock input 32a to the service provider agent device 7 (e.g. using the user interface). The service provider agent device 7 then unlocks 32b the lock to, either directly using communication with the lock to, or by decrypting and displaying the PIN of the generated credential to the service provider agent 6 who inputs the PIN to the lock to. Optionally, the service provider agent device 7 only allows the unlocking if the validity time of the temporary credential encompasses the current time.

When the lock 10 is unlocked, the lock 10 sends an unlock message 33a to the lock manager 1. The lock manager 1 sends a corresponding unlocked message 33b to the co-ordinator 5 which, in turn, sends an unlocked message 33c to the service provider server 3. In this way, the service provider is made aware of the fact that the service provider agent 6 has unlocked the lock 10.

When the service provider agent 6 has performed the ordered service, the service provider agent 6 locks 34 the lock 10 and indicates that the service is done 35a on the service provider agent device 7, e.g. using its user interface. The service provider agent device 7 sends a corresponding done message 35b to the co-ordinator 5, after which the co-ordinator 5 sends a done message 35c to the service provider server 3 and a done message 35d to the lock controller 1. This allows the lock controller 1 to send a done message 35e to the service consumer device 4, which can notify the service consumer 2 that the service has been performed. Furthermore, the lock controller 1 can now send a deactivate message 36 to the lock 10 to prevent the temporary credential from being used again to open the lock 10.

Figure 3:
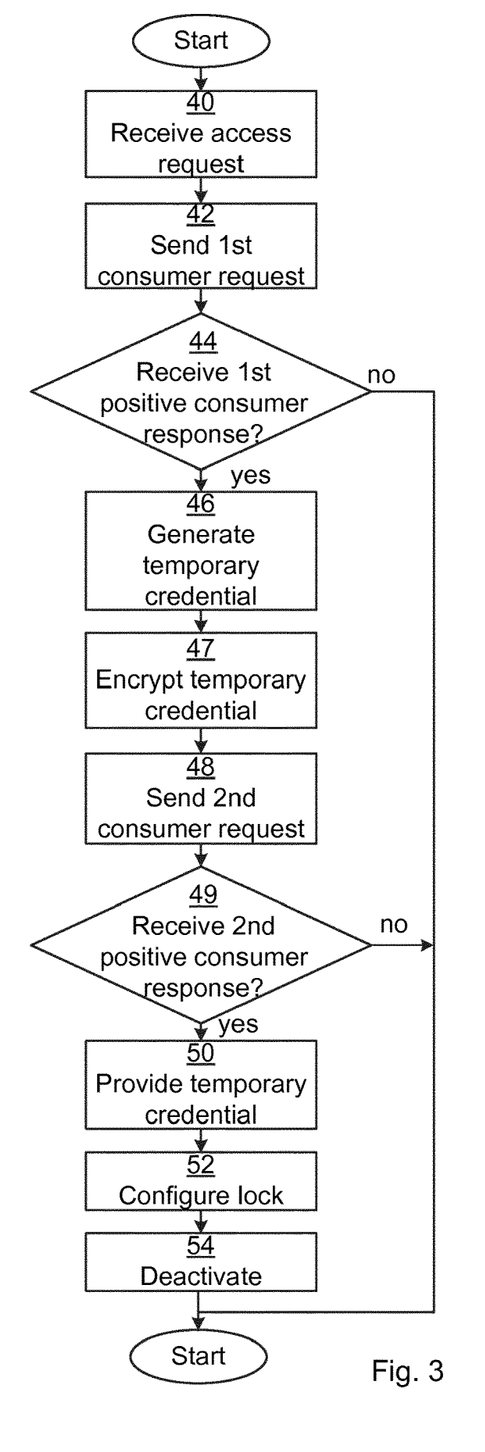
FIG. 3 is a flow chart illustrating embodiments of method for providing access to a lock for provision of a service.

FIG. 3 is a flow chart illustrating embodiments of method for providing access to a lock for provision of a service. As explained above, the lock is associated with a service consumer. The method is performed in the lock manager and corresponds to the actions of the lock manager illustrated in FIG. 2 and described above. Using this method, the service consumer can order a service and conveniently and securely provide access to a physical space secured by a lock.

In a receive access request step 40, a request for access to the lock is received. The request is based on the service consumer ordering a service requiring access to a physical space which is secured by the lock. The access request can be received from the co-ordinator 5.

In a send $1^{st}$ consumer request step 42, a first consumer request is sent to a service consumer device, asking whether to grant access to the lock for a service provider agent to provide the service.

In a conditional receive $1^{st}$ positive consumer response step 44, it is determined whether a first positive consumer response is received from the service consumer device, wherein the positive consumer response indicates that the service consumer allows the service provider agent to access the physical space secured by the lock. If the first positive consumer response is received, the method proceeds to a generate temporary credential step 46. Otherwise, the method ends.

Using this confirmation procedure with the service consumer, the service consumer needs to provide an acceptance that the lock needs to be opened for service provider agent which provides the service. This provides a feedback to the service provider which is then free to prepare the delivery of the service.

In the generate temporary credential step 46, a temporary credential for the service provider agent is generated. The temporary credential can e.g. be a temporary PIN code or a temporary electronic key for use in wireless authentication between a service provider agent device and the lock. The temporary credential can have a validity time associated with it, corresponding to an expected delivery of the service.

In an optional encrypt temporary credential step 47, the temporary credential for the service provider agent is encrypted, yielding an encrypted temporary credential. This prevents the temporary credential from being used by an attacker which would somehow get hold of the temporary credential. The temporary credential can be encrypted with a public key of a cryptographic key pair, after which the temporary credential can only be decrypted by a device having access to the private key of the cryptographic key pair. This increases security against an attacker significantly.

In an optional send $2^{nd}$ consumer request step 48, a second consumer request to a service consumer device is sent, asking whether to grant access to the lock for the service provider agent to provide the service.

Optionally, the send $2^{nd}$ consumer request step 48 is only performed at a configured time prior to when access to a lock for the service provider agent is predicted to be needed. Additionally or optionally, the send $2^{nd}$ consumer request step 48 is only performed when the service provider agent is within a configured distance from the lock. For instance, this step can be triggered when, within the validity time of the temporary credential, the service provider agent is with a certain distance of the lock 10.

In an optional conditional receive $2^{nd}$ positive consumer response step 49, it is determined whether a second positive response is received from the service consumer device, indicating that the service consumer allows the service provider agent to access the physical space secured by the lock. If this is the case, the method proceeds to a provide temporary credential step. Otherwise, the method ends.

In this way, the service consumer is given the option of either accepting or rejecting that the temporary credential is activated. For instance, if the service is intended to be performed at home and the service consumer happens to at home the service consumer can choose to open the door himself/herself, whereby the temporary credential is never activated in the lock 10.

When there is an absence of response to the second consumer request, this is configurable to imply either that the service consumer rejects access or that the service consumer accepts access for the service provider agent.

Optionally, the generate temporary credential step 46 is performed after the receive 2$^{nd}$ positive consumer response step 49 instead of before the send 2$^{nd}$ consumer request step 48.

In a provide temporary credential step 50, the temporary credential is provided to the service provider agent. As shown in FIG. 2, the temporary credential does not need to be communicated directly to the service provider agent; the temporary credential can e.g. be communicated via the co-ordinator. When the encrypt temporary credential step 47 is performed, this step comprises providing the encrypted temporary credential to the service provider agent. The service provider agent device would then decrypt the temporary credential when the service provider agent needs to unlock the lock.

In a configure lock step 52, the lock is configured to accept the temporary credential, being e.g. a temporary PIN or a temporary electronic key.

In an optional deactivate step 54, the lock manager deactivates the temporary credential in the lock. This can be performed after the lock manager receives a signal indicating that the lock has been locked again. Alternatively or additionally, the deactivation can be triggered a specific time period after the lock has been configured or after access to the lock (for the service provider agent) was predicted to occur. This can be done by the lock manager reconfiguring the lock to revoke the temporary credential. By deactivating the temporary credential in the lock, the temporary credential cannot be used again in the same lock. This prevents spreading of credentials or reusing the credential by questionable service provider agents, thus increasing security even further.

For recurring services by the service provider agent, such as a weekly cleaning, the method is repeated except for the steps of sending a first consumer request and receiving a first positive consumer response.

Figure 4:
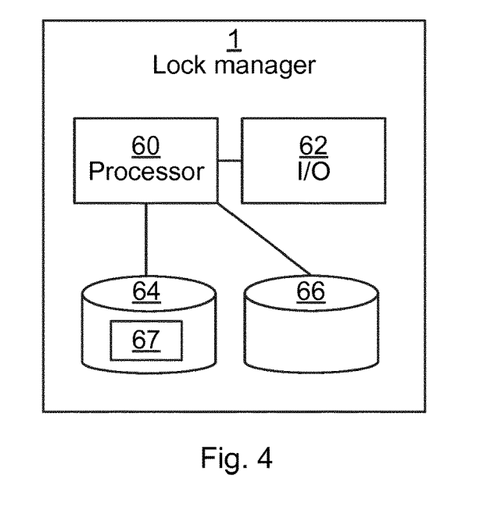
FIG. 4 is a schematic diagram illustrating components of the lock manager of FIG. 1.

FIG. 4 is a schematic diagram illustrating components of the lock manager 1 of FIG. 1. A processor 60 is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 60 can be configured to execute the method described with reference to FIG. 3 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The lock manager 1 further comprises an I/O interface 62 for communicating with other external entities, such as the lock 10, the co-ordinator and the service consumer device. The I/O interface 62 can comprise components communication over any one or more of any of the IEEE 802.11 standards, wireless USB (Universal Serial Bus), USB, Ethernet, serial connection (e.g. RS-485), Bluetooth, Bluetooth Low Energy (BLE), any of the IEEE 802.15 standards, Radio Frequency Identification (RFID), Near Field Communication (NFC), etc.

Other components of the lock manager 1 are omitted in order not to obscure the concepts presented herein.

Figure 5:
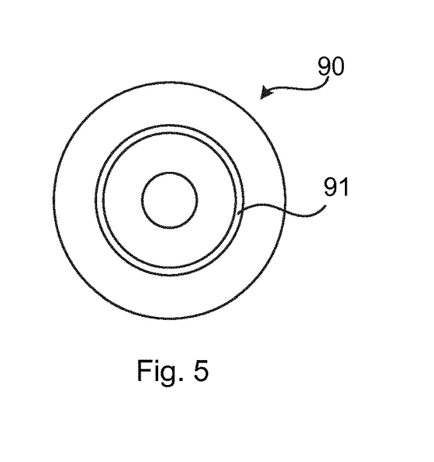
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for providing access to a lock for provision of a service, the lock being associated with a service consumer, the method being performed in a lock manager and comprising:
   receiving a request for access to the lock, the request being based on the service consumer ordering a service requiring access to a physical space which is secured by the lock;
   sending a first consumer request to a service consumer device, asking whether to grant access to the lock for a service provider agent to provide the service;
   receiving a first positive consumer response from the service consumer device, indicating that the service consumer allows the service provider agent to access the physical space secured by the lock;
   generating a temporary credential for the service provider agent;
   providing the temporary credential to the service provider agent; and
   configuring, after the generating of the temporary credential, the lock to, in a subsequent, separate, unlocking session, accept the temporary credential, wherein the configuring occurs in communication between the lock manager and the lock over a wired or wireless interface.

2. The method according to claim 1, further comprising:
   encrypting the temporary credential for the service provider agent, yielding an encrypted temporary credential;
   wherein the providing the temporary credential comprises providing the encrypted temporary credential to the service provider agent.

3. The method according to claim 1, wherein the temporary credential is a temporary personal identification code, PIN.

4. The method according to claim 1, wherein the temporary credential is a temporary electronic key for use in wireless authentication between a service provider agent device and the lock.

5. The method according to claim 1, further comprising the steps of:
   sending a second consumer request to a service consumer device, asking whether to grant access to the lock for the service provider agent to provide the service;

receiving a second positive response from the service consumer device, indicating that the service consumer allows the service provider agent to access the physical space secured by the lock;

wherein the providing the temporary credential and configuring the lock are only performed when the second positive response has been received.

6. The method according to claim 5, wherein when there is an absence of response to the second consumer request, the providing the temporary credential and configuring the lock are still performed.

7. The method according to claim 5, wherein when there is an absence of response to the second consumer request, the providing the temporary credential and configuring the lock are prevented from being performed.

8. The method according to claim 5, wherein the sending a second consumer request is only performed at a configured time prior to when access to a lock for the service provider agent is needed.

9. The method according to claim 5, wherein the sending a second consumer request is only performed when the service provider agent is within a configured distance from the lock.

10. The method according to claim 1, wherein for recurring services by the service provider agent, the receiving a request for access to the lock, the generating a temporary credential for the service provider agent, the providing the temporary credential to the service provider agent, and the configuring the lock to access the temporary credential are repeated without sending a first consumer request and receiving a first positive consumer response.

11. A lock manager for providing access to a lock for provision of a service, the lock being associated with a service consumer, the lock manager comprising:

a processor; and a memory storing instructions that, when executed by the processor, cause the lock manager to:

receive a request for access to the lock, the request being based on the service consumer ordering a service requiring access to a physical space which is secured by the lock;

send a first consumer request to a service consumer device, asking whether to grant access to the lock for service provider agent to provide the service;

receive a first positive consumer response from the service consumer device, indicating that the service consumer allows the service provider agent to access the physical space secured by the lock;

generate a temporary credential for the service provider agent;

provide the temporary credential to the service provider agent; and configure, after the generation of the temporary credential, the lock to, in a subsequent, separate, unlocking session, accept the temporary credential, wherein the configuring occurs in communication between the lock manager and the lock over a wired or wireless interface.

12. The lock manager according to claim 11, further comprising instructions that, when executed by the processor, cause the lock manager to:

send a second consumer request to a service consumer device, asking whether to grant access to the lock for the service provider agent to provide the service;

receive a second positive response from the service consumer device, indicating that the service consumer allows the service provider agent to access the physical space secured by the lock; and only execute the instructions to provide the temporary credential and configure the lock when the second positive response has been received.

13. The lock manager according to claim 12, further comprising instructions that, when executed by the processor, cause the lock manager to, when there is an absence of response to the second consumer request, still execute the instructions to provide the temporary credential and configure the lock.

14. The lock manager according to claim 12, further comprising instructions that, when executed by the processor, cause the lock manager to, when there is an absence of response to the second consumer request, prevent the instructions to provide the temporary credential and configure the lock, from being performed.

15. The lock manager according to claim 12, further comprising instructions that, when executed by the processor, cause the lock manager to only execute the instructions to send a second consumer request at a configured time prior to when access to a lock for the service provider agent is needed.

16. The lock manager according to claim 12, further comprising instructions that, when executed by the processor, cause the lock manager to only execute the instructions to send a second consumer request when the service provider agent is within a configured distance from the lock.

17. A computer program product comprising a computer program for providing access to a lock for provision of a service, the lock being associated with a service consumer, the computer program comprising computer program code which, when run on a lock manager causes the lock manager to:

receive a request for access to the lock, the request being based on the service consumer ordering a service requiring access to a physical space which is secured by the lock;

send a first consumer request to a service consumer device, asking whether to grant access to the lock for a service provider agent to provide the service;

receive a first positive consumer response from the service consumer device, indicating that the service consumer allows the service provider agent to access the physical space secured by the lock;

generate a temporary credential for the service provider agent;

provide the temporary credential to the service provider agent;

configure, after the generation of the temporary credential, the lock to, in a subsequent, separate, unlocking session, accept the temporary credential, wherein the configuring occurs in communication between the lock manager and the lock over a wired or wireless interface.

18. The method according to claim 1, wherein the request comprises a suggested time window for providing the service, the first consumer request comprising the suggested time window, and the first positive consumer response indicates that the service consumer allows the service provider agent to access the physical space during the suggested time window.

19. The method according to claim 1, wherein the configuring comprises adding the temporary credential to a list of credentials that should be allowed access.

20. The method according to claim 1, wherein the communication between the lock manager and the electronic lock occurs using Bluetooth, BLE, an IEEE 802.11 standard, wireless USB, USB, Ethernet, or a serial connection.

* * * * *